United States Patent
Niemeijer et al.

(10) Patent No.: US 8,983,271 B2
(45) Date of Patent: Mar. 17, 2015

(54) CONTINUOUS RE-INSERTION OF ADVERTISEMENTS IN VIDEO CONTENT

(75) Inventors: Gerrit Niemeijer, Maplewood, NJ (US); Andrew Fife, New York, NY (US); Seth Haberman, New York, NY (US)

(73) Assignee: Visible World, Inc., New York, NY (US)

( * ) Notice: Subject to any disclaimer, the term of this patent is extended or adjusted under 35 U.S.C. 154(b) by 132 days.

(21) Appl. No.: 12/789,434

(22) Filed: May 27, 2010

(65) Prior Publication Data

US 2010/0303447 A1 Dec. 2, 2010

Related U.S. Application Data

(60) Provisional application No. 61/181,535, filed on May 27, 2009.

(51) Int. Cl.
| | |
|---|---|
| H04N 9/80 | (2006.01) |
| H04N 21/4147 | (2011.01) |
| G06Q 30/02 | (2012.01) |
| H04N 21/6543 | (2011.01) |
| H04N 21/81 | (2011.01) |
| H04N 21/433 | (2011.01) |
| H04N 21/44 | (2011.01) |
| H04N 5/76 | (2006.01) |

(52) U.S. Cl.
CPC .............. *H04N 5/76* (2013.01); *H04N 21/4147* (2013.01); *G06Q 30/02* (2013.01); *H04N 21/6543* (2013.01); *H04N 21/812* (2013.01); *H04N 21/4331* (2013.01); *H04N 21/44016* (2013.01)
USPC ............ 386/248; 386/239; 386/249; 386/250

(58) Field of Classification Search
USPC .................................................. 386/239–262
See application file for complete search history.

(56) References Cited

U.S. PATENT DOCUMENTS

| | | | | |
|---|---|---|---|---|
| 6,876,974 | B1 * | 4/2005 | Marsh et al. | 705/14.44 |
| 7,440,674 | B2 * | 10/2008 | Plotnick et al. | 386/343 |
| 2002/0083441 | A1 * | 6/2002 | Flickinger et al. | 725/32 |
| 2002/0124251 | A1 * | 9/2002 | Hunter et al. | 725/32 |
| 2003/0039465 | A1 * | 2/2003 | Bjorgan et al. | 386/20 |
| 2003/0105809 | A1 * | 6/2003 | Yoshii et al. | 709/203 |
| 2003/0154128 | A1 | 8/2003 | Liga et al. | |
| 2004/0003397 | A1 | 1/2004 | Boston et al. | |

(Continued)

FOREIGN PATENT DOCUMENTS

| | | |
|---|---|---|
| EP | 1161088 A2 | 5/2001 |
| EP | 1379083 A2 | 1/2004 |

(Continued)

OTHER PUBLICATIONS

European Search Opinion and Supplementary European Search Report from corresponding European Patent Application EP10781252.1, dated May 24, 2013.

*Primary Examiner* — Hung Dang
(74) *Attorney, Agent, or Firm* — Pepper Hamilton LLP

(57) ABSTRACT

Systems which allow for the insertion of targeted advertisements or other messages into programming content, e.g., using Digital Video Recording (DVR) technology are disclosed. Systems use storage to pre-load advertisements, record content with commercials breaks, and merge the advertisements into the recorded content in the background, so that they are available when the content is viewed in time-shifted mode.

26 Claims, 3 Drawing Sheets

(56) References Cited

U.S. PATENT DOCUMENTS

| | | |
|---|---|---|
| 2004/0003398 A1* | 1/2004 | Donian et al. .................. 725/34 |
| 2004/0268384 A1* | 12/2004 | Stone .............................. 725/32 |
| 2005/0097593 A1* | 5/2005 | Raley et al. .................... 725/14 |
| 2005/0152666 A1* | 7/2005 | Demeyer ......................... 386/4 |
| 2006/0222319 A1* | 10/2006 | Russ .............................. 386/52 |
| 2007/0136742 A1 | 6/2007 | Sparrell |
| 2007/0204310 A1 | 8/2007 | Hua et al. |
| 2008/0163289 A1 | 7/2008 | Keys |
| 2009/0013347 A1* | 1/2009 | Ahanger et al. ................ 725/36 |
| 2010/0054707 A1* | 3/2010 | Karaoguz et al. ............... 386/95 |

FOREIGN PATENT DOCUMENTS

| | | |
|---|---|---|
| JP | 2008092074 A | 4/2008 |
| JP | 2009519678 A | 5/2009 |
| WO | 2006076581 A2 | 7/2006 |

* cited by examiner

| ID | Asset | Demo Rules | Content Rules | Time Rules | Playout Rules |
|---|---|---|---|---|---|
| 201 | 202 | 203 | 204 | 205 | 206 |

FIG. 2

CONTINUOUS RE-INSERTION OF ADVERTISEMENTS IN VIDEO CONTENT

CROSS REFERENCE TO RELATED APPLICATIONS

This application claims the benefit of U.S. Provisional Patent Ser. No. 61/181,535 filed May 27, 2009, the entire disclosure of which is incorporated by reference herein.

FIELD OF INVENTION

The invention generally relates to video processing, and more specifically to continuous insertion of advertising content in video media.

BACKGROUND

Consumers of video content are increasingly making use of Digital Video Recorders (DVR) to view content, such as television programming, on a time-shifted basis. Users of such systems are typically able to "record" programming which may be made available on a particular schedule, allowing them to consume the content later, at a more convenient time.

The advent and growing popularity of DVRs in the households of television viewers presents a unique problem to advertisers and the networks or service providers that air advertising content. Because users have the ability to view programming in a non-linear fashion (i.e., the ability to fast-forward, pause, slow-motion or entirely skip content) advertising content can be overlooked and in some instances never be seen by the intended audience.

Further, although it is often desirable to insert local or otherwise targeted advertisements, such as television commercials, into such content, doing so on-the-fly imposes real-time processing requirements which may be difficult or costly to implement. In addition, on-the-fly insertion may also be problematic when users are provided with the ability to consume content in a non-linear fashion. For example, when a user is viewing a portion of content and then quickly rewinds into a commercial break, it may not be possible to identify and insert an appropriate advertisement into that commercial break on-the-fly, without interruption of the user's experience.

What is needed therefore is a system and method of adapting advertising content in a DVR environment that dynamically adapts advertising content to be relevant no matter when the program carrying the advertisement is being viewed.

SUMMARY

Embodiments of the present invention provide for systems which allow for the insertion of targeted advertisements or other messages into programming content, e.g., using Digital Video Recording (DVR) technology. Such example systems may use storage to pre-load advertisements, record content with commercials breaks, and merge the advertisements into the recorded content in the background, so that they are available when the content is viewed in time-shifted mode. Such example systems may reduce the amount of real-time processing required to insert advertisements into recorded content, and may also automatically support "trick" modes during playback, e.g., non-linear modes such as fast forward and rewind.

BRIEF DESCRIPTION OF THE DRAWINGS

The present invention will be more readily understood from a detailed description of the preferred embodiments taken in conjunction with the following figures:

FIG. 2 illustrates an example table in accordance with an example embodiment of the present invention.

DETAILED DESCRIPTION

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value.

It should be understood that the order of steps or order for performing certain actions is immaterial so long as the present teachings remain operable. Moreover, two or more steps or actions may be conducted simultaneously.

Embodiments of the present invention provide systems and methods which allow for the insertion and re-insertion of advertisements into video content, at a time before the content is to be played out. It is here noted that, for the sake of clarity, the example embodiments may be described in the context of inserting advertisements into video content, and some embodiments are described with reference to DVRs and television systems. It is to be understood, however, that the present invention is not limited to such embodiments. Rather, the present invention extends to any type of messages which may be inserted into any type of media content. For example, other embodiments may include the insertion of audio advertisements into musical, or other audio content, etc.

Figure 1:
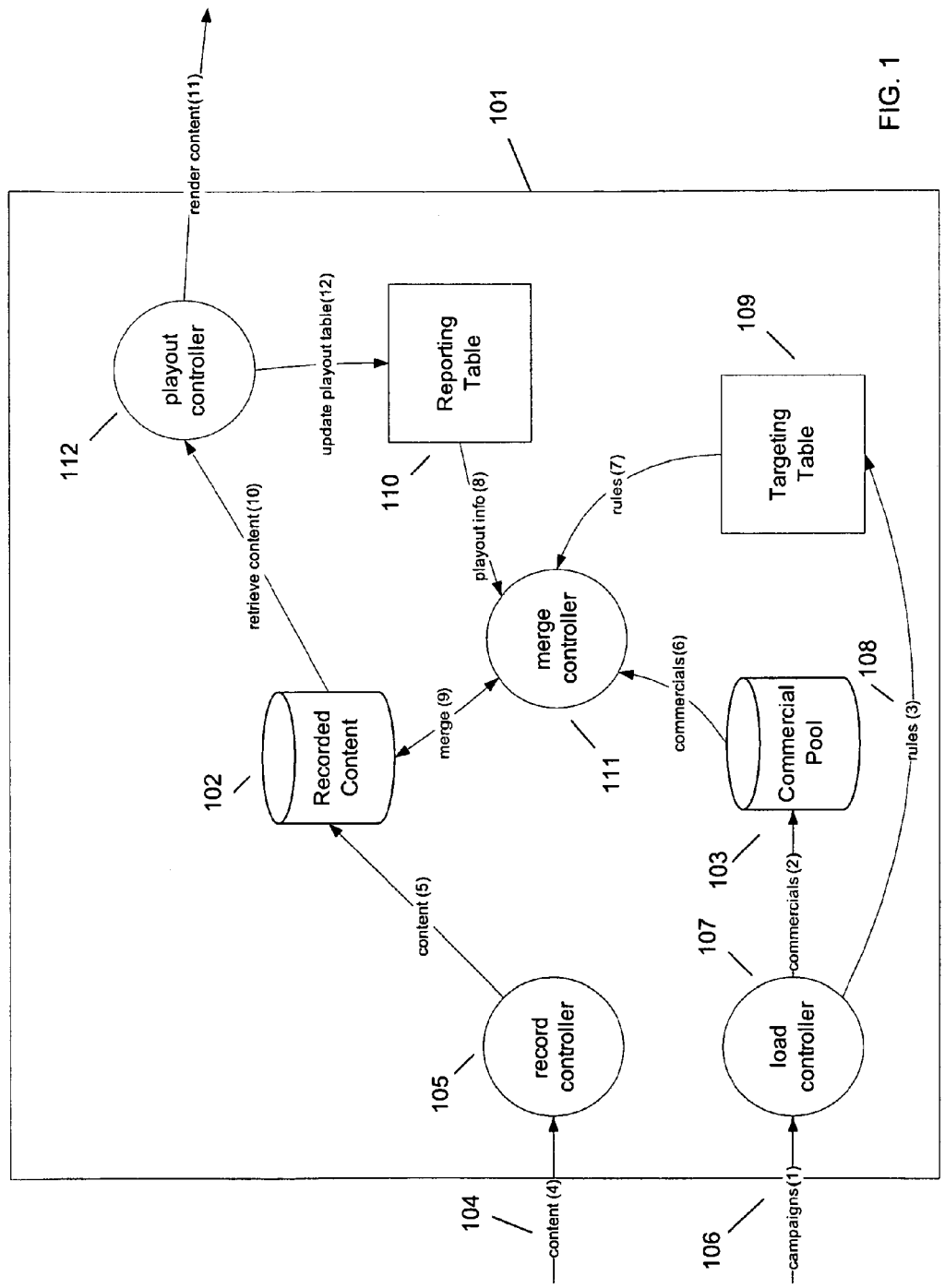
FIG. 1 illustrates an example system in accordance with an example embodiment of the present invention.

A system in accordance with an example embodiment of the present invention is depicted in FIG. 1. FIG. 1 illustrates a system 101, which may, for example, be a Digital Video Recorder (DVR) device, capable of providing users with video content on a time-shifted basis. The system may contain one or more storage devices 102 and 103, which may be configured to store video content, advertisements, and other information. The storage devices may be any devices capable of storing such content, including optical or magnetic media, flash memory or other non-volatile memory, etc. The storage devices, while depicted as two discrete devices may also be implemented as logical devices on the same media source. The illustrative system may also include input and output interface devices configured to receive content, output content, and receive user input. For example, the system may be capable of connecting to a cable television network, over which content may be received. Other example systems may be capable of connecting to other information sources, e.g., the Internet, satellite television networks, over-the-air transmissions, etc. In addition, example systems may be capable of receiving user input, e.g., from a remote control device.

As illustrated, the example system may be capable of receiving feature program content 104. As used herein the term feature program refers to the desired program chosen by a user to record or view, such as a television episode, movie, video clip, audio clip or other consumable media. While illustrative embodiments refer to the content as a feature program, one skilled in the art would recognize that the scope of the invention is not limited only to specialized content sometimes referred to in the art as Feature Films, showcases or presentations.

The content received can be any type of content that the system is capable of processing. For instance, the system may receive video content, including, for example, television programming, films, or other video and audio media. Such content may be linear or non-linear programming, and may originate from any possible source, for example, commercial-free networks, networks that have commercial breaks (some of which can be used for re-inserting commercials at the system), or any other source. In addition, the content received may be in any usable format, for instance, in a standard video format encoded according to an MPEG standard, in an analog format, or in any other format in which the content may be encoded.

In addition, the content may include metadata. For instance, the content may support "addressable" commercial breaks, which may facilitate the insertion of advertisements into the content. To do so, such content may include media break data, which may signal the position of the "addressable" breaks as well as metadata that identifies the break. The data may include all of the information required to insert an advertisement into the break, for example, the start of the break and the duration of the break, as well as information identifying the advertisements or types of advertisements suitable for the break. Such data may be either physically embedded with the content, e.g., stored in the same transport stream or file, or logically embedded, e.g., stored in separate file, but highly time synchronized. Such metadata may be accessible by example systems, which may be configured to read, interpret, and use the data to, e.g., insert advertisements into video content.

One embodiment of the system may provide for the recording of received content. For example, a system may include a record controller 105 which may be configured to receive the incoming content. The record controller 105 may, for example, select some content from the incoming set of content to be recorded. For instance, the record controller 105 may receive a user indication that a particular segment of content or featured content is to be recorded. Such an indication may identify a single piece of content, or may identify a number of pieces of content. For instance, a television program may be identified, which may include multiple episodes, or several distinct programs may be identified, etc. Content may be identified in any usable manner, for example, by channel and time, by name, or by any unique identifier.

As it receives content to be recorded, the record controller 105 may store the content on a storage device 102, or on another storage media. The content may be stored in any acceptable form. For instance, the content may be stored in a compressed digital form. In addition, the content may be encrypted to prevent unauthorized playback and copying of the content. The record controller 105 may also store any metadata associated with the content. For example, the record controller may store metadata indicating insertion points for advertisements. Such metadata may be recorded along with the content and/or may be extracted and stored separately from the content, for example in a table of such metadata.

Example systems may also receive television commercials 106, or other types of advertisements, addressable content or messages, which may be inserted into commercial breaks. Such advertisements may be received together with the primary content or may be received separately from it. In addition, such advertisements may be received over the same communication system from which the content is received or may be received using a different system. For example, advertisements may be received over a cable television network and recorded, downloaded from an Internet source, or received via fixed media through a USB port or another suitable local interface.

For example, a system may include a load controller 107, which may be configured to load new advertisements and advertisement campaigns onto the system. For instance, the load controller 107 may receive new advertisements or campaigns using an in-band video transport network, or any other suitable network. The load controller 107 may then identify and extract individual advertisements from the received material and may store them on a storage device 103 or on some other storage system. In addition, the load controller 107 may also extract targeting rules 108 for the advertisements and may store them in a targeting table 109, as explained further below.

In one embodiment, the advertisements may be stored in a special "advertisement pool" area on the storage device 103. Such an area may not be directly accessed by an end user of the system. For instance, a user of the system may not be provided with the ability to directly view, alter, or delete advertisements stored on the system. Rather, the advertisements may be viewed by the user only when the system inserts an advertisement into content, etc. Of course, in other embodiments, such a storage area need not be provided, and advertisements may be directly accessible.

In example embodiments, the stored advertisements are maintained by a service provider. For instance, an example system may be configured to allow a service provider to issue a set of advertisements which may be received by the system as discussed above. In addition, the system may be configured to allow the service provider to manage the advertisements. For example, the service provider may periodically, or continuously, make available new advertisements, which may replace older advertisements or which may add to the existing advertisements. The service provider may also delete advertisements which are no longer in use, and may similarly manage any insertion rules associated with the advertisements.

In addition to the content and advertisements, example systems may store information enabling the system to insert appropriate advertisements. Again, the system may store such information in a local storage device, or in some other storage in communication with the system. For instance, a system may contain a targeting table 109, which may store metadata associated with the particular advertisements which may be inserted into programming. For instance, for each stored advertisement, targeting table 109 may include all of the information necessary to determine when insertion of that advertisement is appropriate. For example, the targeting table 109 may include rules for targeting each advertisement. The targeting table 109 may also include information about the types of content into which the advertisement should be inserted, the time of day the advertisement should be shown, demographics which should be targeted, or any other parameters defining or identifying a target audience.

An example targeting table is depicted in FIG. 2. FIG. 2 illustrates a number of categories of information which might appear in a targeting table. For instance, a unique asset ID 201 may be stored in the table, identifying a particular advertisement which may be stored on the system. Similarly, the table may contain an asset name 202, which may be a unique name which, for example, allows a stored advertisement to be located. The table may also contain demographic rules 203. Such rules may provide information allowing advertisements to be targeted at particular consumers, for example by age, gender, income, residence, employment, etc. Using such information, advertisements may be delivered to viewers.

Example targeting tables may also include content rules 204, which include rules that specify content specific targeting. For example, the table may contain information indicating that a particular advertisement should be inserted into the content of a particular program or network, or content falling in a certain genre. In addition, example tables may also contain time rules 205, which include rules that specify time specific targeting. For instance, a table may include information indicating that a particular advertisement should be inserted into prime time programming or should be inserted only on weekends. Example tables may also include playout rules 206, which may specify how an advertisement should be inserted given other insertions, or renderings, of the advertisement. For instance, a table may contain information indicating that a particular advertisement is to be shown no more than a predetermined number of times in content of a certain duration. Tables may contain rules specifying any such behavior such as, without limitation, setting a minimum number of appearances, a frequency cap, rotation rules, etc.

Returning to FIG. 1, example systems may also maintain a reporting table 110, which may contain statistics concerning usage of the system and user consumption of content and advertising. The reporting table may store playout information about particular advertisements and/or regular content. For example the table may contain data on if, when, and how often a certain advertisement or segment of content was viewed, the times at which it was viewed, for how long it was viewed, or the manner it was viewed (i.e., whether it was fast-forwarded or rewound, etc.) Such a table may also record information identifying the content into which particular advertisements are inserted.

Example systems may also include a processor, which may be configured to insert advertisements into the content. For example, a system may include a merge controller 111, which may scan recorded content for "eligible" media breaks, i.e., breaks in content into which an advertisement may be inserted. For example, as mentioned above, content may include metadata indicating the location of a commercial break in content, into which an advertisement may be inserted. Such metadata may be encoded in a traditional manner, e.g., as a tone appearing in a content signal, or may be more elaborate metadata. Example systems may search each content segment for the appearance of such metadata and/or signaling. Typically such metadata will appear shortly before a commercial break, e.g., 5-10 seconds before an advertisement may be inserted. "Eligibility" of a particular break for re-insertion, may be determined in any appropriate manner. For example, metadata identifying the break may only be transmitted for eligible breaks, so that by definition all recorded breaks that have metadata are eligible. Alternatively, the metadata itself may include an eligibility identifier flagging a break as eligible, or targeting rules may be used to identify eligible breaks.

For each eligible break, the merge controller 111 may evaluate whether to insert an advertisement. To do so, the merge controller 111 may utilize any information relevant to evaluating whether insertion of a particular advertisement is appropriate. For example, the merge controller 111 may access a targeting table 109, a reporting table 110, or other information, and may correlate that information to determine the best advertisement for the break under consideration at the current time, etc. If the merge controller 111 identifies an advertisement more appropriate than the advertisement currently embedded in the content, it can replace the current advertisement with the optimal advertisement. For instance, the merge controller 111 may write the advertisement into the saved content and may store that content. Alternatively, the merge controller 111 may create a new instance of the content containing the advertisement, and may also store the newly created instance.

It is noted that an inserted advertisement may be inserted into content in any suitable format, and that it need not be encoded identically to the content itself. For example, an inserted advertisement may have the same or a different resolution than the content to which it is inserted; if the advertisement is inserted into encrypted content, the advertisement may also be encrypted or may be inserted in unencrypted form; etc.

In example embodiments, the merge controller 111 may analyze content and insert advertisements before playback of the content is requested. Such a merge controller 111 may be configured to analyze recorded content according to any reasonable schedule. For instance, it may be configured to analyze content as soon as it is recorded, or as it is recorded. Alternatively, the merge controller 111 may be configured to analyze content based on a predetermined schedule, or may be configured to assess the current processing demands on the system and to analyze content when other processing demands are sufficiently low.

Because the optimal advertisement for a given break may change based on environmental factors, for example the current time of day, and because the set of available advertisements may change, merge controllers 111 may also be configured to continuously analyze each piece of recorded content. For example, a merge controller 111 may analyze each piece of recorded content in turn. Once it has analyzed each piece of content, it may return to the first piece of content and may begin again, performing the processes indefinitely. Merge controller 111 may be configured to perform such a process continuously, or may perform the process on a schedule, e.g., every 30 minutes. Other merge controllers 111 may, however, use any reasonable processes for analyzing content. For instance, some merge controllers 111 may analyze recorded content in a continuous loop. When new content is recorded, however, the merge controller 111 may immediately processes the new content before continuing with the loop.

As a result, after processing, each content segment may contain both the original content and also the inserted advertisement. When a user requests playback of the content, the content may be played immediately, without the need for on-the-fly advertisement insertions. Such a system may help ensure that content is played back smoothly, without noticeable discontinuities introduced during the insertion of advertisements. In addition, such a system may need fewer resources or may be able to more efficiently use the resources available to it. For instance, because insertion happens ahead of consumption of content, the insertion process may take longer to complete than would be acceptable on the fly. Accordingly, example systems may be constructed with less processing resources or may be able to allocate the available resources to other tasks. Other illustrative embodiments allow for more efficient use of storage. For instance, an example system may not store all of the available advertisements. Rather, the system may store a complete set of rules for the insertion of advertisements, e.g, a targeting table. Should the system determine that a particular advertisement should be inserted into content, the system may download the advertisement from a remote source at that time. Because the content is not currently being viewed, the time necessary to complete the download and insert the advertisement may not interrupt a user experience.

In addition, such example systems naturally account for non-linear playback of content. For example, a system may permit a user to initiate a number of "trick" modes, e.g., fast forward, rewind, jump-to-scene, etc., while viewing content. By pre-inserting advertising ahead of playback, example systems are able to provide for such trick modes reliably without further processing. Such a system needs only to render the already processed content file to the user, as the content contains pre-inserted advertisements at the time of rendering.

According to one embodiment, systems may also include a playout controller 112 configured to playback content for user consumption. The playout controller 112 may be configured to receive an indication from a user directing the system to playout a particular piece of content. For example, the playout controller 112 may be capable of receiving an indication input with a remote control device, or any other suitable input device. The playout controller 112 may then simply retrieve the content and render that content to the user. Because the local advertisements have already been inserted into the content by the merge controller 111, there is no need for further processing. The content is simply rendered. In addition, as the playout controller renders content, it may update information about the advertisements and content rendered, e.g., information stored in a reporting table 110. Of course, the playout controller 112 may be configured to provide any of the functions typical of playout systems. For instance, the playout controller 112 may be configured to playout content in a fastforward or a rewind mode, which again may be activated by input from a user.

Figure 3:
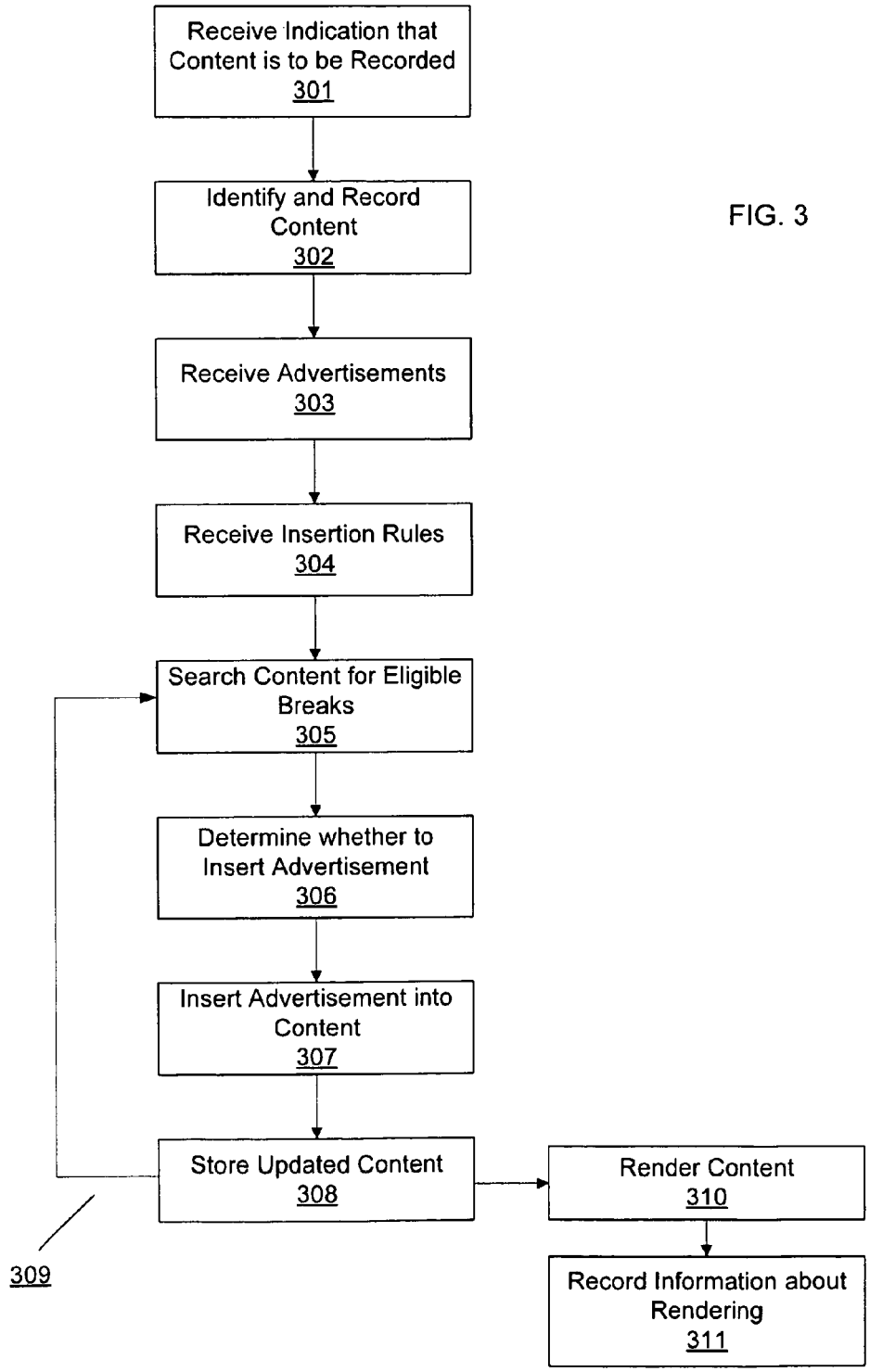
FIG. 3 illustrates an example procedure in accordance with an example embodiment of the present invention.

Other example embodiments may provide procedures for inserting advertisements or other messages into content. FIG. 3 illustrates such an example procedure. The illustrated procedure may begin by receiving an indication that featured program content is to be recorded 301. For instance, a user may indicate a particular television program or programs that are to be recorded, or a preset schedule of programming to be recorded may be referenced. The indication may be received in any reasonable manner, and may identify the content that is to be recorded.

The content may then be identified and recorded 302. For example, if the content is a television program, the content may be received over a cable network, satellite network, over-the-air-antenna, the Internet, or fixed media such as a USB or portable memory device. The received content may then be stored. The received content may be encoded as a file and saved on a local or remote storage medium, such as a magnetic or optical storage device, or flash memory. The content may be stored in any suitable format. For instance, the content may be MPEG-encoded, and may be encrypted.

Advertisements or advertising campaigns may also be received 303. For instance, advertisements may be received from a service provider, and may be received using any suitable communications media, a cable television network, satellite network, over-the-air-antenna, the Internet, or fixed media such as a USB or portable memory device. The advertisements received may form a set of advertisements which may be available for insertion into content. For example, the advertisements may be a set of television commercials which may be inserted into television programming, in order to provide targeted advertising, etc. The received advertisements may also be stored, either locally or remotely, and may form an advertisement pool. As noted above, the advertisements may be stored in a form that is not directly accessible by end users.

Media insertion rules may also be received and stored 304. For instance, the information described above in connection with targeting tables may be received and stored as insertion parameters, possibly in the form of a targeting table. Such information may be received along with an advertisement or advertisements packaged together, for example, as an advertisement campaign. Rules and parameters may provide information about when insertion of a particular advertisement is appropriate. For instance, rules associated with a particular advertisement may be received which may indicate demographics to be targeted, content into which the advertisement is to be inserted, times at which the advertisement should be inserted, the manner in which multiple insertions of the advertisement should be handled or other conditions dictating insertion.

Once such information is received, the stored content may be searched for breaks into which advertisements may be inserted 305. For instance, each piece of content stored may be analyzed to identify "eligible" breaks, as explained above. In order to identify such breaks, metadata associated with the content may be identified. As explained above, that metadata may indicate a number of properties about a break in the content. For instance, metadata may identify the existence of a break, may indicated the location and duration of the break, may indicate whether the break is eligible for re-insertion, etc.

Once a break in a piece of content is identified, it may be determined whether an advertisement should be inserted into the break 306. For instance, the content may currently have either an original or a re-inserted advertisement recorded in the break. That advertisement may, however, not be an optimal advertisement for the break anymore. Rather, another available advertisement may be identified as a more appropriate advertisement for the break, based on the insertion rules associated with that advertisement, and other information, such as, without limitation, environmental information, such as the time of day, or programming characteristics, such as the name of a television program which the content encodes.

If an advertisement is identified as appropriate for insertion, the advertisement may be inserted into the content 307. For instance, the advertisement may be inserted into the content file in place of any advertisements which may have previously been recorded in the content file. As explained above, the advertisement may be inserted in any reasonable manner and may be encoded in any useable form, which may or may not need to match the content itself. For instance, the advertisement may be inserted in an unencrypted form, while the content itself may or may not be encrypted.

Once the advertisement is inserted into the content, the content may be stored in its updated form 308. As explained above, the content may be stored in place of the older version of the content, or may be stored as a new instance of the content. As stored, the content may be in a complete form, including a full set of both content and advertisements. As such it may be available for playout to a user, without further processing.

Once each piece of stored content is analyzed and advertisements inserted where appropriate, the process may begin again 309. Each piece of recorded content may be continuously evaluated and new advertisements inserted where relevant. In this way, the recorded content may always be stored in a complete form, ready for playback, and including the most relevant advertisements. Therefore, there may be no need to insert advertisements into such content on-the-fly.

Should a user indicate that a particular piece of content is desired, the content may be made available immediately 310. For instance, the content file may be accessed and rendered. As the content file already contains the most relevant advertisement no further processing may be needed. In addition, as advertisements in the content are played out, information about the rendering may be recorded 311. For example, a reporting table, as described above, may be updated, which may then influence future determinations as to whether particular advertisements should be inserted into content.

It will be appreciated that all of the disclosed methods and procedures described herein may be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

The invention claimed is:

1. A method of adapting media content comprising:
receiving a feature program and storing the feature program for a duration in a memory device;
receiving addressable content;
receiving by a processor media insertion rules defining parameters of media insertion into the feature program;
analyzing by the processor the feature program for media break data;
correlating by the processor insertion parameters in the media insertion rules with the media break data;
generating an updated feature program by inserting addressable content into the feature program based on the correlation of the insertion parameters and the media break data;
storing in the memory device the updated feature program comprising the inserted addressable content for the duration; and
continuously analyzing the updated feature program while the updated feature program is inactive during the duration that the updated feature program is being stored in the memory device responsive to at least one event, the processor replacing addressable content with optimal addressable content subject to the media insert rules,
wherein the at least one event comprises at least one of expiration of a predetermined time, completion of an analysis loop and receiving addressable content.

2. The method of claim 1 further comprising reporting to a table usage statistics from the updated feature program.

3. The method of claim 2 wherein the usage statistics are selected from the group consisting of: user consumption, times viewed, duration of viewing, manner of viewing, and advertisement identification.

4. The method of claim 1 wherein the media break data comprises an eligibility indicator.

5. The method of claim 1 further comprising storing the addressable content into a pool on the memory device.

6. The method of claim 5 further comprising targeting the addressable content from the pool to an intended audience.

7. The method of claim 1 wherein the media insertion rules further comprise demographic targets, content identification, insertion times and insertion manner.

8. The method of claim 1, wherein the updated feature program is inactive responsive to the updated feature program not being played back.

9. The method of claim 8, wherein the updated feature program is inactive responsive to the updated feature program not being recorded.

10. A system for continuously adapting media content comprising:
a network interface configured to receive media content comprising feature content and addressable content;
a memory device configured to receive and store feature content for a duration, the feature content comprising media break data;
a load controller in communication with the network interface, the load controller receiving addressable content from the network interface and preparing the addressable content for insertion;
a targeting table accessible by the load controller, the targeting table comprising metadata associated with the addressable content detailing addressability parameters;
a merge controller in communication with the memory device, the load controller and the targeting table, the merge controller continuously analyzing the feature content while the feature content is inactive during the duration that the feature content is being stored in the memory device and identifying media break data responsive to at least one event comprising at least one of expiration of a predetermined time, completion of an analysis loop and receiving addressable content, the merge controller identifying the optimal addressable content for insertion into the feature content based on at least the media break data and the addressability parameters, the merger controller directing the insertion of the appropriate addressable content into the feature content to generate updated feature content, the updated feature content being stored in the memory device as the feature content for the duration; and
a playout controller in communication with the memory device, the playout controller being configured to retrieve the feature content for delivery to an end-user through an output interface.

11. The system of claim 10 wherein the media break data is selected from the group consisting of: start of break, duration of break, end of break, and content identification.

12. The system of claim 10 wherein the addressable content is stored in a pool on the second memory device, the addressable content being inaccessible to the end-user.

13. The system of claim 10 further comprising a second memory in communication with the load controller and the merge controller, the addressable content being stored on the second memory device.

14. The system of claim 10 wherein the load controller periodically receives updated addressable content from a service provider.

15. The system of claim 10 wherein the targeting table further comprises an advertisement identifier, name, and a rules set.

16. The system of claim 15 wherein the rules set further comprises targeted demographic rules.

17. The system of claim 15 wherein the rules set further comprises content rules directing content specific targeting.

18. The system of claim 15 wherein the rules set further comprises time rules directing time specific targeting.

19. The system of claim 15 wherein the rules set further comprises playout rules.

20. The system of claim 10 further comprising a reporting table in communication with the merge controller and playout controller, the reporting table comprising usage statistics.

21. The system of claim 20 wherein the usage statistics are selected from the group consisting of: user consumption, times viewed, duration of viewing, manner of viewing and advertisement identification.

22. The system of claim 20 wherein the merge controller identifies the appropriate addressable content for insertion based on the reporting table.

23. The system of claim 10 wherein the merge controller identifies the appropriate addressable content for insertion based on the targeting table.

24. The system of claim 10 wherein the media break data comprises an eligibility indicator.

25. The system of claim 10, wherein the updated feature program is inactive responsive to the updated feature program not being played back and not being recorded.

26. A digital recording viewer comprising:
at least one input interface configured to receive feature content and addressable content over a network;
at least one memory device;
a record controller in communication with the at least one input interface and the at least one memory device, the record controller storing the feature content for a duration in the at least one memory device;
a load controller in communication with the at least one input interface, the load controller receiving addressable content from the network interface and preparing the addressable content for insertion, the addressable content being stored in the at least one memory device;
a reporting table in communication with the merge controller and playout controller, the reporting table comprising usage statistics;
a targeting table in communication with the load controller, the targeting table comprising metadata associated with the addressable content detailing addressability parameters;
a merge controller in communication with the at least one memory device and the targeting table, the merge controller continuously analyzing the feature content while the feature content is inactive during the duration that the feature content is being stored in the at least one memory device and identifying media break data responsive to at least one event comprising at least one of expiration of a predetermined time, completion of an analysis loop and receiving addressable content, the merge controller identifying the optimal addressable content for insertion into the feature content based on the media break data, targeting table and reporting table and directing the insertion of the appropriate addressable content into the feature content to generate updated feature content, the updated feature content being stored in the at least one memory device as the feature content for the duration;
a playout controller in communication with the at least one memory device, the playout controller retrieving the feature content; and
an output interface in communication with the playout controller, the output interface delivering the updated feature content to an end-user.

* * * * *